UNITED STATES PATENT OFFICE.

CHARLES G. TROSIEN, OF PONTIAC, MICHIGAN.

AUTOMOBILE-LOCK.

1,397,564.  Specification of Letters Patent.  Patented Nov. 22, 1921.

Application filed March 8, 1919. Serial No. 281,361.

*To all whom it may concern:*

Be it known that I, CHARLES G. TROSIEN, a citizen of the United States, residing at Pontiac, county of Oakland, State of Michigan, have invented a certain new and useful Improvement in Automobile-Locks, and declare the following to be a full, clear, and exact description of the same, such as will enable others skilled in the art to which it pertains to make and use the same, reference being had to the accompanying drawings, which form a part of this specification.

My invention relates to automobile locks and an object of my improvements is to provide an improved means for locking the change speed gearing in its neutral position.

I secure this object in the device illustrated in the accompanying drawings in which,—

$a$ is the casing for the change speed gearing. $b\ b$ are the shifting rods used in the selective type of change speed gearing. The rods $b\ b$ are provided with notches $b^2\ b^2\ b^3$ in their surfaces which serve in conjunction with the detents, or pawls, hereinafter described, to indicate the different positions of the gearing. $a^2$ is a vertical extension of the casing $a$ adapted to receive a pin-lock mechanism $a^3$. $a^4$ is a transverse aperture in the casing $a$ of about the same diameter as the rods $b\ b$ and having its axis in the same plane. $c\ c$ are two tubular pieces having their remote ends closed and formed into the shape of a cone, this shape adapting them to act as dogs, or detents, to engage in the notches $b^2\ b^2\ b^3$. Within the tubular parts $c\ c$ and having an end bearing against each of said parts is the compression spring $d$. This spring acts to press the parts $c\ c$ yieldingly into the notches $b^2\ b^2\ b^3$ of the rods $b\ b$.

$e$ is a rod placed within the helical spring $d$ and approximately coaxial with the part $c\ c$, this rod being of such a length that it will permit of the movements of one of the parts $c$ in the aperture $a^4$, to draw it from a notch $b^2$ or $b^3$ in one of the rods $b$ but will prevent the withdrawal of both of said parts $c\ c$ from their respective notches.

Figure 3:
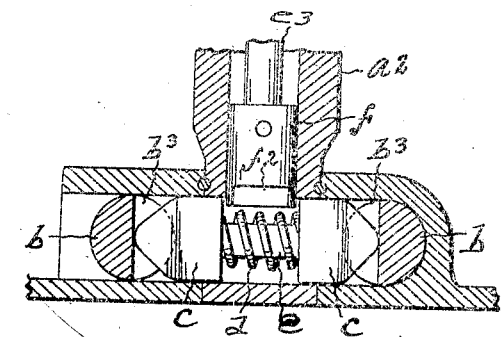
Fig. 3 is a detail sectional elevation of a part of Fig. 2 to an enlarged scale, the parts being in locked position.
Figure 2:
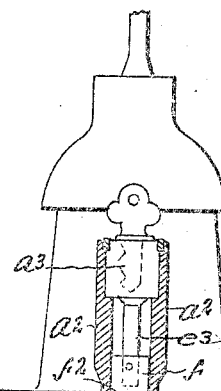
Fig. 2 is a section on the line II—II Fig. 1.
Figure 4:
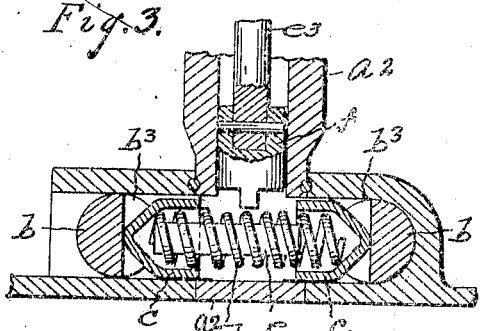
Fig. 4 is a view similar to Fig. 3 but more completely in section, the parts being in unlocked position.
Figure 5:
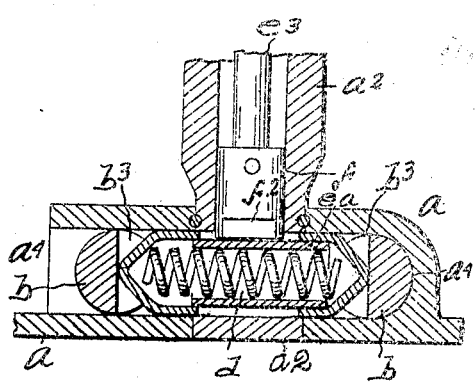
Fig. 5 is a view similar to Fig. 4 showing a modified construction.
Figure 6:
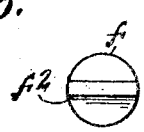
Fig. 6 is an inverted plan view of the locking cam.
Figure 1:
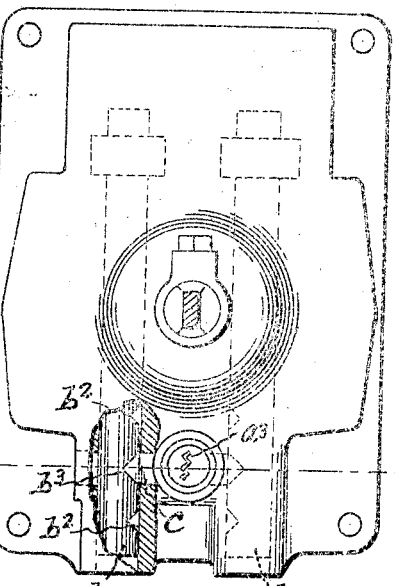
Figure 1 is a plan view partly broken away of a change speed gearing for an automobile.

In Fig. 5 there is shown a tubular rod $e\ a$ as an alternative form of the rod $e$. The tubular rod $e\ a$ fitting within the parts $c\ c$ and over the spring $d$ and performing the same function and of the same length as the rod $e$.

$f$ is a cylindrical part adapted to rotate in the extension $a^2$ from the casing $a$, the part $f$ is provided with a cam-like extension $f^2$ at its lower end and is engaged by the pin-lock $a^3$ so as to rotate with the latter. The cam $f^2$ extends between the inner ends of the parts $c\ c$. When it is turned in a position transverse to the axis of said parts one or the other of said parts may move out of engagement with the notch in a shifting rod $b$. When the part $f$ is turned so that the cam $f^2$ extends parallel to the axis of the parts $c\ c$ the cam interposes itself in the path of travel of said parts and they cannot move out of engagement with the notches and the shifting rods $b$ and thus said rods are locked and the gearing cannot be used.

The notches $b^3$ correspond to the neutral position of the change speed gearing and when they are opposite each other, as illustrated in the drawing, and the cam $f^2$ turned to its locked position, then the gearing is locked in its neutral position and the automobile cannot be used.

What I claim is:

1. In a change speed gearing, a pair of gear shifting rods having slots in their adjacent sides, a series of parts consisting of end parts and an intermediate part adapted to limit the movement of the end parts toward each other, said end parts engaging in said slots, and a cam adapted to interpose itself between the end parts of said series to hold the same in engagement in said slots in one position of said cam or when moved to another position to permit the movement of said end parts.

2. In a change speed gearing, a pair of gear shifting rods having slots in their adjacent sides, a series of parts consisting of end parts and an intermediate part, said end parts engaging in said slots, and a cam adapted to interpose itself between the end parts of said series to hold the same in engagement in said slots in one position of said cam or when moved to another position to permit the movement of said end parts, said series of parts being adapted to lock one of said shifting rods when the other of said rods is moved.

3. In a change speed gearing, a pair of gear shifting rods having slots in their adjacent sides, a pair of parts located between said gear shifting rods and adapted to engage in said slots, a third part intermediate the first mentioned parts for limiting the movement of the latter toward each other and a cam rod extending normal to a plane through said shifting gear rods and adapted to rotate about its axis to interpose a cam between said pair of parts or to release said parts.

4. In a change speed gearing, a pair of gear shifting rods having slots in their adjacent sides, a pair of parts located between said gear shifting rods and adapted to engage in said slots, and a third part intermediate the first mentioned parts for limiting the movement of the latter toward each other, and a spring between said pair of parts acting to force said parts into engagement with said slots.

5. In a change speed gearing, a pair of gear shifting rods having slots in their adjacent sides, a pair of parts located between said gear shifting rods and adapted to engage in said slots, and a third part intermediate the first mentioned parts for limiting the movement of the latter toward each other, and a spring between said pair of parts acting to force said parts into engagement with said slots, said intermediate part being concentric with said spring.

6. In a change speed gearing, a pair of gear shifting rods having slots in their adjacent sides, a pair of parts located between said gear shifting rods and adapted to engage in said slots, and a third part intermediate the first mentioned parts for limiting the movement of the latter toward each other, and a spring between said pair of parts acting to force said parts into engagement with said slots, said spring and intermediate part being in supporting relation to each other.

7. In a change speed gearing, a pair of gear shifting rods having slots in their adjacent sides, a series of parts consisting of end parts and an intermediate part adapted to limit the movement of the end parts toward each other, said end parts being adapted to engage in said slots and a cam adapted to interpose a locking means immediately between the end parts of said series to hold the same in engagement in said slots in one position of said cam or when moved to another position to permit the movement of said end parts.

In testimony whereof, I sign this specification.

CHARLES G. TROSIEN.